United States Patent
Gorissen

[15] 3,652,911
[45] Mar. 28, 1972

[54] SWITCHGEAR FOR ELECTRICALLY OPERATED WINDOWS OF VEHICLES, ESPECIALLY MOTOR VEHICLES

[72] Inventor: Wolfhelm Gorissen, Stuttgart, Germany

[73] Assignee: Firma Dr.-Ing.h.c.f. Porsche K.G., Stuttgart-Zuffenhausen, Germany

[22] Filed: June 9, 1970

[21] Appl. No.: 44,700

[30] Foreign Application Priority Data

June 19, 1969 Germany.....................P 19 31 169.4

[52] U.S. Cl..............................318/474, 192/131, 307/10
[51] Int. Cl.........................................................H02p 7/00
[58] Field of Search..................318/475, 474, 267; 192/131; 307/10

[56] References Cited

UNITED STATES PATENTS

| | | | |
|---|---|---|---|
| 2,461,261 | 2/1949 | Drisko | 318/475 X |
| 2,757,327 | 7/1956 | Oliver | 318/475 X |
| 2,901,076 | 8/1959 | Dean | 318/475 X |
| 2,962,633 | 11/1960 | Raymond | 192/131 X |

*Primary Examiner*—Benjamin Dobeck
*Attorney*—Craig, Antonelli and Hill

[57] ABSTRACT

Switchgear for electrically operated windows of vehicles, especially motor vehicles, wherein the drive motor is controlled by means of a switch arranged within the passenger compartment. The switchgear includes a slipping clutch provided with a safety device which reacts to an unacceptably high friction or resistance to the movement of the window by interruptions of the driving force. The switchgear amplifies the moment of movement of the windows through a safety switch arranged on an instrument panel in the vehicle. The slipping clutch is arranged between the drive shaft of the drive motor and the window-lifting linkage. The slipping clutch is capable of clutching through a bridging member controlled by a relay which is, in turn, controlled by the safety switch.

11 Claims, 1 Drawing Figure

PATENTED MAR 28 1972 3,652,911
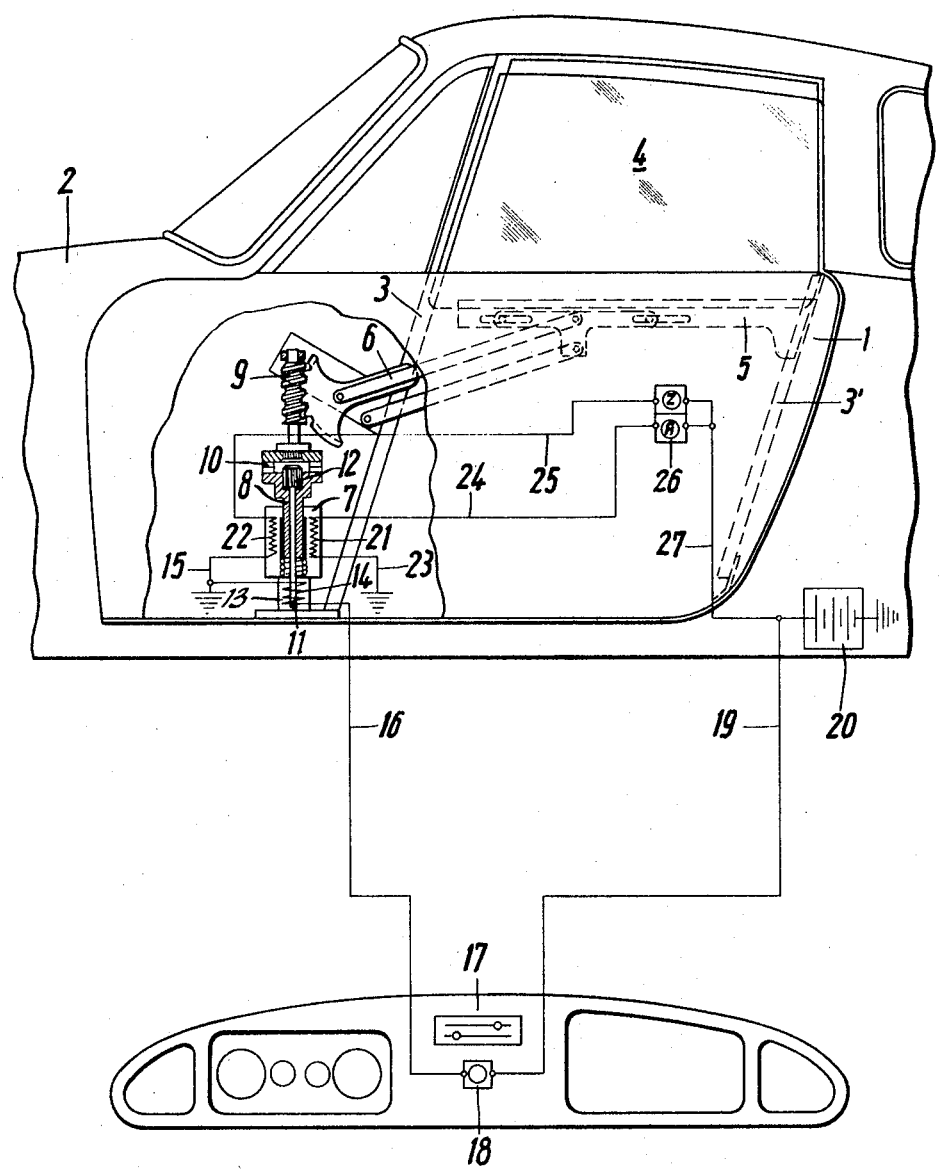
Inventor:
WOLFHELM GORISSEN
BY Craig, Antonelli, Stewart & Hill
ATTORNEYS

3,652,911

SWITCHGEAR FOR ELECTRICALLY OPERATED WINDOWS OF VEHICLES, ESPECIALLY MOTOR VEHICLES

BACKGROUND OF THE INVENTION

The present invention relates to a switchgear for electrically operated windows of vehicles, especially motor vehicles, and more particularly, to electrically operated windows in which the drive motor is controlled by means of a switch arranged within the passenger compartment and including a slipping clutch provided with a safety device which reacts or responds when an unacceptably high friction or resistance to the movement of the window exists to interrupt the driving force.

It is known to provide a switchgear for the opening and closing of an electrically operated window. In the conventional arrangement, the drive motor is connected with the window by means of a load cable. The housing of the drive motor is swingably supported against the force of a spring and is provided with contact tongues for a safety switch. For operating the windows, a switch of the corresponding vehicle door must be operated, whereby a current circuit to the drive motor is closed. If the window senses an increase resistance to the movement thereof through, for example, a pinched object, the housing of the drive motor is swingingly moved due to the increased reaction moment and the contact tongues operate the safety switch. The direction of movement of the window as well as the direction of rotation of the drive motor is thereby reversed.

The disadvantage of the conventional arrangement resides in that, with windows frozen into window guides, opening or closing thereof is not possible since the reaction moment effecting the drive motor actuates the safety switch through the high resistance to movement and through the running or operating reversal of the direction of rotation of the drive motor, leaves the window standing in its instant position.

SUMMARY OF THE INVENTION

It is an aim of the present invention to overcome the problems and disadvantages of the prior art devices.

In particular, it is an object of the present invention to provide a safety switch for an electrically operated window of vehicles, especially motor vehicles.

It is a further aim of the present invention to provide a switchgear for electrically operated windows of motor vehicles which amplifies the moment of movement of the windows through a specially arranged safety switch and yet still extensively avoids the danger of injury through pinching between the upper edge of the window and the door frame.

The underlying problems are solved in accordance with the present invention by providing a slipping clutch arranged between the drive shaft of the drive motor and the window-lifting linkage, which slipping clutch is capable of clutching through a bridging member controlled with a switching relay.

In an advantageous manner, the switching relay of the bridging member is controlled through a safety switch which is additionally included in the control circuit of the switches for the window. Preferably, the safety switch for the switching relay of the control circuit of the bridging member is arranged remotely from the switches of the windows and, more particularly, about in the center of the instrument panel of the motor vehicle.

The arrangement of the present invention results in several advantages. The slipping clutch may be arrested by a bridging member controlled with a switching relay. In this manner, the full torque of the drive motor may be transmitted to the window-lifting linkage when the windows are frozen solid. Since the switching relay of the bridging element is controlled by a safety switch included in the shifting circuit of the window-actuating switch, the slipping clutch is arrested only as long as the window-actuating switch and the safety switch are operated together. Thus, the danger of injury through pinching of the fingers on a hand between the door or window frame and window is avoided through the arrangement of the safety switch in approximately the center of the instrument panel.

Accordingly, it is an object of the present invention to provide a switchgear for electrically operated windows of vehicles, especially motor vehicles, in which a slipping clutch is provided having a safety device which responds when an unacceptably high friction or resistance to the movement of the window exists.

It is another object of the present invention to provide a switchgear for electrically operated windows of motor vehicles which amplifies the moment of movement of the windows through a specially arranged safety switch.

A further object of the present invention is to provide a switchgear in which the full torque of the drive motor may be transmitted to the window-lifting linkage when the windows are frozen solid.

A still further object of the present invention resides in the provision of a slipping clutch which is arrested only as long as the window actuating switch and the safety switch are operated together, thereby preventing the pinching of fingers or limbs between the window and door or window frame.

BRIEF DESCRIPTION OF THE DRAWING

These and further objects, aims and features of the present invention will become more apparent from the following description when taken in connection with the accompanying drawing which shows, for purposes of illustration only, an embodiment in accordance with the present invention, and wherein:

The sole FIGURE is a partial view of a motor vehicle having an electrically operated window in the door together with a schematic diagram of the control arrangement of the present invention.

DETAILED DESCRIPTION OF THE DRAWING

Referring now to the sole FIGURE, there is shown a door 1 of a motor vehicle 2 having a window 4 which is guided vertically movable in a guiding device 3, 3'. The lower edge of the window 4 is provided with a rail 5 which is operatively connected with a window-lifting linkage 6. The linkage 6 is operated by an electric drive motor 7 which is reversible in its rotational direction through drive shaft 8 as well as gearing 9. Between the drive shaft 8 of the drive motor 7 and gearing 9, there is arranged a slipping clutch 10. The clutch 10 is so constructed that under normal operating conditions the torque of the drive motor 7 is transmitted to the window-lifting linkage 6. With increased resistance to movement of the window 4, however, the connection between the drive shaft 8 and gearing 9 is loosened.

The slipping clutch 10 is further provided with a bridging element 11 which includes a follower 12 slidably arranged in the drive shaft 8 to provide the possibility of a solid connection between drive shaft 8 and gearing 9. The bridging element 11 is connected with a switching relay 13 which serves for overbridging the slipping clutch 10. The switching relay 13 incorporates a magnetic coil 14 which is connected over a line 15 with ground and through a line 16 over a safety switch 18, which is fastened to the instrument panel 17, with the supply line 19 of the current source 20.

The safety switch 18 is provided with a pushbutton S with which lines 16, 19 may be connected over contacts (not shown). The drive motor 7 is provided with two field windings 21, 22 which are connected with a switch 26 fastened to the vehicle door 1 through lines 15, 23 with ground and through lines 24, 25. Switch 26 has two pushbuttons A and Z through which the lines 24, 25 are selectively connected with line 19 leading to the current source 20.

In order to open the window 4, pushbutton A of switch 26 is operated. As a result, current flows from the source 20 through line 19, the switch 26, line 24 to the field winding 21 of the driving motor 7 as well as over line 23 to ground. The drive shaft 8 of the driving motor 7 is thereby driven, and the window 4 is operated through the gearing 9 of the window-lifting linkage 6. As long as the pushbutton A of switch 26 is operated, the window 4 is moved in the direction "OPEN." By releasing the pushbutton A, the window 4 remains in the instant position.

Closing of the window 4 is accomplished by operating the pushbutton Z of switch 26. As a result of this, the current flows from current source 20 through line 19, 25 to the field winding 22 of drive motor 7 and over the line 15 to ground. The direction of rotation of the drive motor 7 is thereby reversed and the window 4 is closed through slipping clutch 10 of the gearing 9 and the window-lifting linkage 6.

In case, however, the resistance against movement of window 4 during the opening or closing operation exceeds a certain desired value, the slipping clutch 10 loosens the connection between drive shaft 8 and gearing 9, and the window thus remains stationary.

During the cold season, it is extremely likely that the window 4 will be frozen in its guide devices 3, 3'. In operating one of the pushbuttons A or Z of switch 26, the resistance to movement through the solidly frozen 4 will be so large that the slipping clutch 10 in each direction of rotation of drive motor 7 will separate the drive shaft 8 from the gearing 9 of the window-lifting linkage 6.

In order to transmit the full torque of the drive motor 7 to the gearing 9 when the window is solidly frozen, the switch 26 must be simultaneously operated with the safety switch 18 at the instrument panel 17. By depressing pushbutton S of the safety switch 18, a current flows from the current source 20 through lines 19, 16 to the magnetic coil 14 of the switch relay 13. The magnetic coil 14 is therefore energized and shifts the bridging element 11 which is arranged in the drive shaft 8 toward the gearing 9 of the window-lifting linkage 6. The bridging element 11 with its follower 12 is mounted for axial movement with respect to drive shaft 8 but is rotatably fixed with respect to shaft 8. The bridging element 11 thereby arrests the shifting clutch 10 by means of the follower 12 engaging in the gear teeth of both shaft 8 and member 9. The drive connection between the drive shaft 8 and the gearing 9 is thereby solidly connected so that full torque of the drive motor is transmitted to the window-lifting linkage 6, and the window 4 may be broken loose from the frozen guiding devices 3, 3'.

Because of the arrangement of the safety switch 18 located in approximately the center of the instrument panel 17, a two hand operation for loosening, for example, the frozen window 4 is assured so that the danger of injury to the operator is thereby avoided.

While I have shown and described one embodiment in accordance with the present invention, it is to be clearly understood that the same is susceptible of numerous changes and modifications as will be apparent to one skilled in the art, and I, therefore, do not wish to be limited to the details shown and described herein but intend to cover all such changes and modifications as are encompassed by the scope of the present invention.

I claim:

1. Switchgear for use with electrically operated windows on motor vehicles of the type having passenger compartments; said switchgear comprising a drive motor for opening and closing the windows, a switch located in the passenger compartment for controlling the operation of said drive motor, drive connection means between said drive motor and said window for transferring drive motor motion to said window, said drive connection means including a slipping clutch for automatically interrupting the transfer of said drive motor motion to the window when resistance to the movement of said window reaches a predetermined undesired value, a selectively movable bridging element for overriding the slipping clutch to thereby reinstate the driving connection between the drive motor and the window, and actuation means to actuate the movement of said bridging element.

2. Switchgear according to claim 1, wherein said actuation means includes control relay means.

3. Switchgear according to claim 2, wherein a safety switch is provided for controlling the control relay means.

4. Switchgear according to claim 3, wherein the safety switch is included in the control circuit of the first-mentioned switch.

5. Switchgear according to claim 3, wherein the safety switch is located remotely from the first-mentioned switch.

6. Switchgear according to claim 5, wherein the safety switch is located in approximately the center of an instrument panel inside of the passenger compartment.

7. Switchgear according to claim 6, wherein the safety switch is included in the control circuit of the first-mentioned switch.

8. Switchgear according to claim 7, wherein the first-mentioned switch is located in a door of the vehicle.

9. Switchgear according to claim 2, wherein the bridging element is provided with follower means slidably arranged in a drive shaft of the drive motor for selectively effecting a solid connection between the drive shaft and a window-lifting linkage.

10. Switchgear according to claim 9, wherein a safety switch is provided for controlling the control relay means, said control relay means including a magnetic coil which is selectively connected with a current source via the safety switch, and the drive motor includes a plurality of field windings operatively connected via the first-mentioned switch to the current source.

11. Switchgear according to claim 10, wherein the first-mentioned switch includes a plurality of pushbuttons, one of the pushbuttons being operatively connected between one field winding and the current source and another of the pushbuttons being operatively connected between a second field winding and the current source.

* * * * *